March 20, 1951  H. W. DOUGHTY  2,545,654

METHOD FOR ABSORBING GASES IN LIQUIDS

Filed May 28, 1946

INVENTOR
*Howard Waters Doughty*
BY
*Pennie Edmonds Morton & Barrows*
ATTORNEYS

Patented Mar. 20, 1951

2,545,654

UNITED STATES PATENT OFFICE 2,545,654

METHOD FOR ABSORBING GASES IN LIQUIDS

Howard Waters Doughty, Amherst, Mass., assignor to Firetox Company, Holyoke, Mass., a corporation of Rhode Island Application May 28, 1946, Serial No. 672,885

10 Claims. (Cl. 23—193)

This invention relates to the absorption of gases in liquids and particularly to an improved method and apparatus adapted to facilitate the preparation of solutions of various gases in liquids in which such gases may be soluble.

It is relatively easy to dissolve gases in liquids in which they may be soluble by merely passing the gas into the liquid. A difficulty arises frequently because absorption is more rapid than delivery of the gas from the source. In that case, there may be a reversal of flow or "suck-back" which causes the absorbing liquid to pass backwardly through the gas line to the source thereof. This is most likely to occur when the last of the gas is being delivered and the pressure drops to the equilibrium pressure of the solution. However, it may occur at other times for various reasons. Obviously the result is undesirable and should be avoided.

It is the object of the present invention to provide a simple and effective method of and apparatus for absorbing a gas in a liquid which avoids the difficulty mentioned and permits the preparation of desired solutions in a satisfactory manner.

Other objects and advantages of the invention will be apparent as it is better understood by reference to the following specification and the accompanying drawing, in which Fig. 1 is a diagrammatic view of an apparatus adapted for the practice of the invention;

I have discovered that the absorption of gases in liquids may be carried out without difficulty by interposing what may be termed a "liquid valve" between the absoring liquid and the gas inlet. This liquid valve consists of a layer of liquid which is heavier than the absorbing liquid, immiscible and chemically non-reactive therewith, and which does not appreciably absorb the gas or chemically react therewith.

A variety of liquids are suitable for the purpose of the invention and will be selected in view of the foregoing conditions, depending upon the absorbing liquid and the gas to be absorbed therein. Mercury, for example, usually fulfills all of the conditions and is well adapted to perform the function of the liquid valve. It is however very heavy and quite expensive, and hence will be utilized probably only where less expensive suitable liquids are not available. Among the liquids which are relatively inexpensive and otherwise suitable are the halogen derivatives of the hydrocarbons, particularly those of high molecular weight and density between 1.5 and 3.0 grams per cubic centimeter. There are many such halogen derivatives, and it will suffice to indicate certain examples of this class, including sym.-tetrabromo ethane (acetylene tetrabromide) sym.-tetrachloro ethane (acetylene tetrachloride) ethylene bromide and tetrachloro ethylene. Other halogenated hydrocarbon derivatives which may be used include chloroform, carbon tetrachloride and commercial tetrachloro ethane. Mixtures of these compounds may be used. Particularly where the operation may be conducted below freezing point temperatures of such substances as ethylene bromide or acetylene tetrabromide, it may be desirable to add proportions of tetrachloro ethylene, chloroform or other low melting point halogenated hydrocarbons for the purpose of lowering the freezing point of the mixture.

When a layer of one of the liquids mentioned or the equivalent thereof is disposed beneath the body of absorbing liquid, and the gas to be absorbed is conducted into the lower layer of heavier liquid, the latter being at all times saturated to its limited extent with the gas, there is no tendency to greater absorption, and consequently no disturbance of the equilibrium pressure, or in any event even if absorption of the gas in the heavier liquid is not actually zero, the equilibrium will be disturbed very slowly. Consequently, even if the pressure of the gas is reduced owing to rapid absorption in the absorption liquid, the disturbance of the equilibrium pressure in the absorption liquid will not result in reversal of flow of the liquid through the gas line. The difficulty heretofore experienced in absorbing gases and liquids is thus completely avoided.

Figure 1:
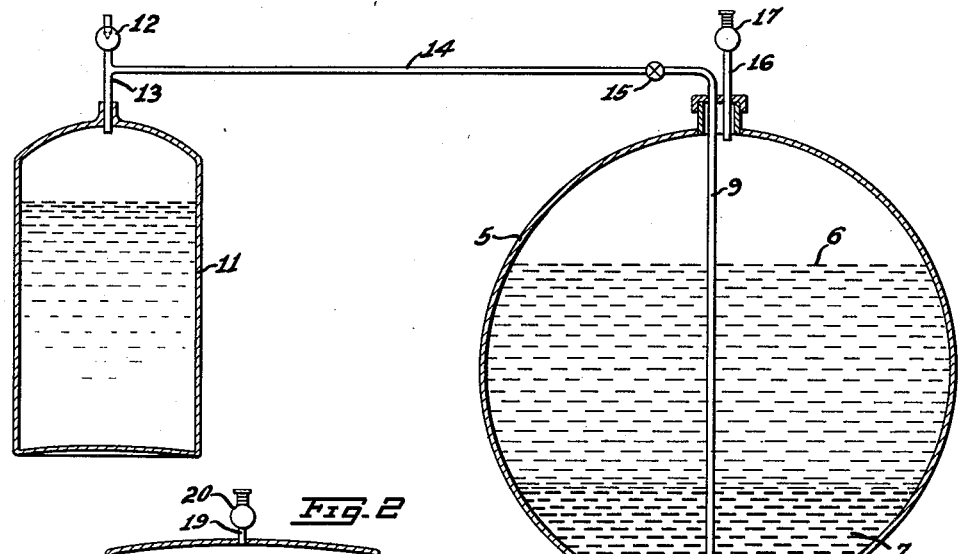

Apparatus for the practice of the invention may be very simple. Thus, referring to Fig. 1, 5 indicates a vessel which may be cylindrical in form, although the shape is of no substantial importance. Within the vessel is a body of the absorption liquid and a layer 7 of a heavier liquid of the class hereinbefore described, forming the liquid valve. A closure 8 is adapted to be secured in an opening in the top of the vessel 5. It supports a downwardly extending pipe 9 which terminates below the surface of the layer of liquid 7. The pipe 9 may have an extension 10 extending longitudinally of the vessel 5 and may be perforated to permit the escape of gas into the layer of liquid 7. The gas may be supplied from a cylinder 11 of the ordinary form in which gases are customarily transported, having a valve 12 and a connection 13 for a pipe 14 which joins the pipe 9 and is provided with a valve 15 to control the flow of gas. An outlet 16 and safety valve 17 are secured to the closure 8 in order to avoid the possibility of excessive pressures within the container 5.

In the operation of the device as described, the valves 12 and 15 being open, the gas is permitted to flow through the pipe 9 and extension 10 into the layer of liquid 7 acting as the liquid valve. The gas is disseminated in bubbles and passes through the interface between the layer of liquid 7 and the body of absorbing liquid 6, being thus thoroughly distributed. The gas is readily absorbed in the absorbing liquid 6 as rapidly as it may be delivered. The presence of the heavier liquid 7 forming the liquid valve prevents disturbance of the equilibrium pressure and consequently any "suck-back" through the pipes 9 and 14.

Figure 2:
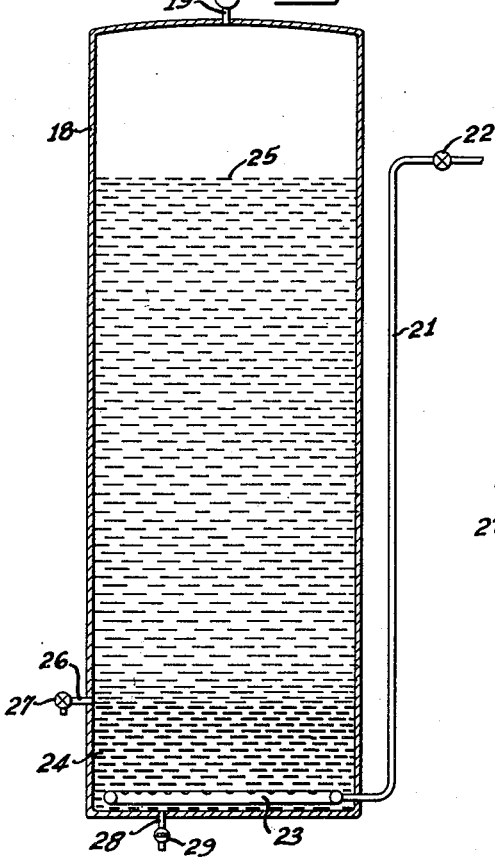
Fig. 2 is a similar view of a modified form of the apparatus.

Referring to Fig. 2, the absorbing container is preferably in the form of a tower 18 having an outlet 19 and safety valve 20 to prevent excessive pressures. Gas is delivered through a pipe 21 controlled by a valve 22 to a perforated coil 23 disposed in the bottom of the tower 18 beneath a layer 24 of heavier liquid as hereinbefore described. The body 25 of absorbing liquid is above the layer 24. An outlet 26, provided with a valve 27, permits withdrawal of the solution of the gas at the end of the operation. A drain pipe 28 controlled by a valve 29 permits draining of the tower. The operation is substantially as hereinbefore described, with similar results and advantages.

Figure 3:
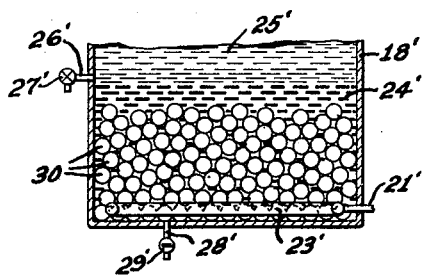
Fig. 3 is a fragmentary view illustrating another modification.

The effectiveness of the heavy liquid which forms the liquid valve is dependent upon its depth in the absorption receptacle and its density, rather than upon its total volume. The depth of the liquid may be increased while the total volume is decreased by partially filling the bottom of the absorption receptacle with suitable inert filling material such as balls, rings, etc., of ceramic, glass, or other non-reactive material. Irregularly shaped pieces of the inert material are equally effective. This is illustrated in Fig. 3 of the drawing, in which the tower 18' contains a multiplicity of small spheres 30 disposed in the layer 24', thus raising the level of the inert liquid as may be observed by comparison with Fig. 2. The gas is introduced through the coil 23' from a pipe 21'. The outlet for the solution 26' controlled by a valve 27' is raised so that it is above the layer of heavier liquid. A drain pipe 28' controlled by a valve 29' is provided as in the embodiment shown in Fig. 2. Besides the economy due to the need of less of the heavy liquid, the filling material breaks up the bubbles of gas, causing a wider distribution to the interface between the heavier liquid and the absorption liquid, and thus facilitates absorption of the gas in the absorption liquid.

The application of the invention will be illustrated by the problem of producing aqueous ammoniacal solutions. An aqueous solution of ammonia 26° Bé. (29.4%) is readily available in the market, as is also anhydrous liquid ammonia. It is difficult to obtain in the market a solution of 28° Bé. (33.32%) ammonia solution, which is required for certain technical purposes. The 28° Bé. solution may be prepared readily by absorbing ammonia from a cylinder of anhydrous liquid ammonia in water or in the commercial 26° Bé. solution, using the liquid valve as hereinbefore described. The procedure of thus increasing the percentage of ammonia in the aqueous solution or in preparing such a solution from water, is hazardous except for the application of the liquid valve as described herein. By the use of the invention, the operation can be conducted simply and effectively to produce the desired result. Thus, from a 50-gallon drum of 26° Bé. ammonia which is readily obtainable, 12½ gallons are withdrawn, leaving 37½ gallons which may then be saturated with the contents of a 17-pound cylinder of liquid ammonia. The product will be 28° Bé. ammonia suitable for applications for which the 26° Bé. solution is not adapted. This is merely a simple application of the invention, which may be operated on any scale to produce larger or smaller quantities of the desired product.

Although the example relates to the solution of ammonia, the invention is not limited to this particular application. It may be utilized for a wide variety of purposes to produce solutions of the desired strength of various gases in liquids in which such gases may be soluble, employing as a liquid valve one or more of the liquids mentioned herein or equivalent liquids having the characteristics defined, that is, that the liquid employed in the liquid valve is heavier than the absorption liquid, is immiscible and chemically non-reactive with the absorption liquid, absorbs the gas to only a limited extent if at all, and is chemically non-reactive therewith. Suitable liquids conforming to this requirement are readily available and hence the invention is universally applicable to its intended purpose.

Various changes may be made in the form of the apparatus employed and in the details of procedure without departing from the invention or sacrificing the advantages thereof.

I claim:

1. The method of adsorbing a gas in a liquid which comprises maintaining a superlying body of an absorbing liquid over and in contact with a body of a heavier liquid which is immiscible and chemically non-reactive with the absorbing liquid and which does not appreciably absorb and does not chemically react with said gas, introducing the gas into the heavier liquid below the interface of the two liquids, and passing the gas through the heavier liquid into the absorbing liquid for absorption therein, whereby the heavier liquid acts as a liquid valve to prevent back flow of the absorbing liquid into the means by which the gas is introduced.

2. The method of claim 1 in which the heavier liquid is a member of the class consisting of halogen derivatives of hydrocarbons of high molecular weight and which have a density between 1.5 and 3 grams per cubic centimeter.

3. The method of claim 1 in which the heavier liquid is a member of the class consisting of sym.-tetrachloro ethane, sym.-tetrabromo ethane, ethylene bromide, tetrachloro ethylene, chloroform, carbon tetrachloride and tetrachloro ethane.

4. The method of claim 1 in which the heavier liquid is mercury.

5. The method of claim 1 in which a multiplicity of inert solid objects are substantially submerged in the heavier liquid.

6. The method of producing aqueous ammoniacal solutions which comprises maintaining a superlying body of an aqueous absorbing liquid over and in contact with a body of a heavier liquid which is immiscible and chemically non-reactive with the aqueous absorbing liquid and which does not appreciably absorb and does not chemically react with gaseous ammonia, introducing the gaseous ammonia into the heavier liquid below the interface of the two liquids, and passing the ammonia through the heavier liquid into the aqueous absorbing liquid for absorption therein, whereby the heavier liquid acts as a liquid valve to prevent back flow of the aqueous absorbing liquid into the means by which the gas is introduced.

7. The method of claim 6 in which the heavier liquid is a member of the class consisting of halogen derivatives of hydrocarbons of high molecular weight and which have a density between 1.5 and 3 grams per cubic centimeter.

8. The method of claim 6 in which the heavier liquid is a member of the class consisting of sym.-tetrachloro ethane, sym.-tetrabromo ethane, ethylene bromide, tetrachloro ethylene, chloroform, carbon tetrachloride and tetrachloro ethane.

9. The method of claim 6 in which the heavier liquid is mercury.

10. The method of claim 6 in which a multiplicity of inert solid objects are substantially submerged in the heavier liquid.

HOWARD WATERS DOUGHTY.

REFERENCES CITED

The following references are of record in the file of this patent:

UNITED STATES PATENTS

| Number | Name | Date |
|---|---|---|
| 158,265 | Fales | Dec. 29, 1874 |
| 847,273 | Bacon | Mar. 12, 1907 |
| 1,605,251 | MacMillan et al. | Nov. 2, 1926 |
| 1,674,993 | Riley et al. | June 26, 1928 |
| 1,685,598 | Davis | Sept. 25, 1928 |
| 1,866,443 | Zumbro | July 5, 1932 |
| 1,910,386 | Garrett | May 23, 1933 |
| 1,958,938 | Bohandy | May 15, 1934 |

FOREIGN PATENTS

| Number | Country | Date |
|---|---|---|
| 376,269 | Great Britain | July 4, 1932 |